Figure 1:
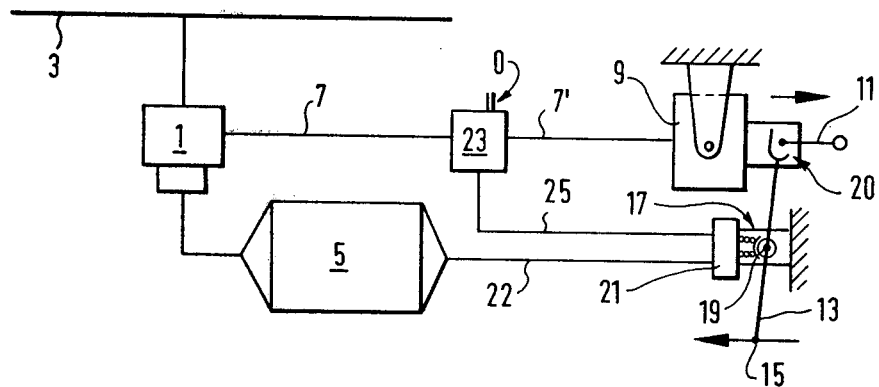

United States Patent [19]

Pöllinger

[11] 4,265,492
[45] May 5, 1981

[54] BRAKING APPARATUS FOR VEHICLES

[75] Inventor: Hans Pöllinger, Munich, Fed. Rep. of Germany

[73] Assignee: Knorr-Bremse GmbH, Munich, Fed. Rep. of Germany

[21] Appl. No.: 37,128

[22] Filed: May 8, 1979

[30] Foreign Application Priority Data

May 12, 1978 [DE] Fed. Rep. of Germany ....... 2820921

[51] Int. Cl.³ .............................................. B60T 11/24
[52] U.S. Cl. .......................................... 303/14; 303/71
[58] Field of Search .................. 303/6 A, 6 R, 13, 14, 303/68, 71, 89

[56] References Cited

U.S. PATENT DOCUMENTS

| 3,294,455 | 12/1966 | Valentine | 303/13 X |
| 3,443,839 | 5/1969 | Hinrichs et al. | 303/13 X |
| 4,036,533 | 7/1977 | Kraft | 303/6 A |

FOREIGN PATENT DOCUMENTS 2310248 12/1976 France ..................................... 303/6 A Primary Examiner—Duane A. Reger
Attorney, Agent, or Firm—Edmund M. Jaskiewicz

[57] ABSTRACT

A braking apparatus for vehicles has a switching device which controls the admission of pressure fluid to the braking cylinder of a service brake and is operated by a reaction force acting upon a coupling or bearing support between the switching device and a lever operatively connected to a parking or locking brake. When this reaction force exceeds a predetermined limit upon operation of the parking brake, the switching device is actuated to release the service brake. The service brake is released at that time when the parking brake already applies a braking force and the short period of time between the parking brake being locked and prior to release of the service brake is so short that the brake linkage of the service brake is not subjected to any damaging effects.

7 Claims, 2 Drawing Figures

BRAKING APPARATUS FOR VEHICLES

The present invention relates to a vehicle braking apparatus of the type having both a service brake and a parking brake, more particularly, to the release of the service brake upon a predetermined application of the parking brake.

Vehicles have been provided with a braking system in which a service brake braking cylinder is subjected to the admission of fluid under pressure through control valve devices and where there is also provided a parking brake which acts upon the braking member of the service brake. In general, the service brake and the parking brake act upon the same linkage which is responsible for the braking action and which includes the brake shoes. As a result, the brake linkage and brake rods must be properly dimensioned so as to withstand the combined forces exerted by the service brake and the parking brake.

When braking by the service brake while the parking brake is applied, upon release of the service brake the total braking force existing in the brake linkage system is shifted over to the parking brake. As a result, when the parking brake is provided with push rods the total force acting upon push rods can become so great that it is virtually impossible to release the parking brake. When Bowden cables are used in the parking brake, these cables can be subjected to such high forces that they become overloaded.

In braking apparatus of the type generally described above it has been proposed to release the service brake as soon as the parking brake has been applied (DE-GM No. 7707274). For this purpose, adjacent to the braking cylinder or to the operating point of the parking brake rod there is provided a three-way valve on the piston rod of the brake cylinder. The three-way valve has an operating member which is so connected with elements of the parking brake cam system that in the released position of the parking brake the brake cylinder can be unrestrictedly submitted to the braking pressure; and conversely, at the moment of application of the parking brake, the brake fluid under brake pressure to the cylinder is interrupted and the brake cylinder is vented. The operating member of the three-way valve responds to a predetermined point on the path of the cam. In order to coordinate precisely the beginning and the magnitude of this path of travel with the holding force of the parking brake, it is necessary that there is a precise adjustment of the relative positions regarding the movement of all components of the three-way valve operating member control elements.

The disadvantage of such a known "control path device", is that the service brake may become released before the parking brake is applied or that the service brake is released only when the parking brake is applied so as to exert a high force. Thus, this known braking apparatus is not satisfactory since the selective operation of the parking brake can be accompanied by an addition of the forces applied by both the service and parking brakes.

There has also been provided a braking apparatus wherein a brake operating by compressed air is combined with a hydraulically operated parking brake (DE-Gbm No. 76 37 986). In this braking apparatus a special valve must be provided which prevents the development of hydraulic pressure for controlling the parking brake in the presence of air pressure for operating the service brake. By an appropriate and careful construction of the various components of both pressure fluid systems, one can achieve a state in which the total force of the combined service and parking brakes will not exceed the maximum force of the parking brake device. However, for this braking device in addition to the source of compressed air there must also be provided a hydraulic pressure system. The provision of an additional hydraulic pressure system on non-powered vehicles such as railway cars is not particularly desireable in view of the additional expenses of construction. Further, the special valve must be provided with packings both for the air and for the hydraulic fluid and such packings result in a considerable increase in cost.

There is also known (DE-PS No. 1 287 956) an air pressure braking system for motor vehicle trailers utilizing two conduits to assure that braking action occurs under all service conditions which could occur when the trailer brakes are applied. The tractor can be braked at least with a spring brake and the trailer can be braked with the compressed air brake. However, the simultaneous braking action of the spring and air brakes will not produce on any one axle an overbraking or excessive braking effect. Such systems generally incorporate three separate control valves wherein one valve device has a balanced piston connected by a lever to two coaxially disposed valves. This arrangement is intended to provide that upon a braking operation even when disturbances should occur in the entire system or in components thereof there will be produced a braking effect which does not endanger in any way the travel of the vehicle.

It is therefore the principal object of the present invention to provide an improved braking apparatus for a vehicle having a service brake and a selectively operable parking brake.

It is another object of the present invention to provide such a braking apparatus wherein no undesireable addition of the service brake and parking brake forces will occur and which avoids the necessity of fabricating the components according to close and precise manufacturing tolerances.

It is a further object of the present invention to provide such a braking apparatus wherein upon the application of one brake when the other brake has already been applied no deficiencies in braking will occur and upon subsequent application of the parking brake there will be no overloading of the parking brake or its components.

It is an additional object of the present invention to provide such a braking apparatus which can be readily installed, can be easily adjusted after installation and which can be manufactured without significantly increasing the cost of the braking apparatus.

According to one aspect of the present invention a braking apparatus for vehicles may comprise a service brake having a fluid pressure operated brake cylinder which is connected to control device means for controlling the brake cylinder. An actuating member extends from the brake cylinder and is adapted to be connected to a braking member in a known manner. A selectively operable parking brake is connected by a lever to the service brake actuating member. A switching device is connected to the control device means to control the admission of fluid pressure to the brake cylinder and coupling means are provided between the lever and the switching device. The switching device is actuated by a reaction force acting upon the coupling means through the lever when the parking brake is actuated to a locking position. It is preferable that the switching device is actuated only when the reaction force exceeds a predetermined level.

The braking apparatus according to the present invention may be actuated by pneumatic or electric controls.

Figure 2:
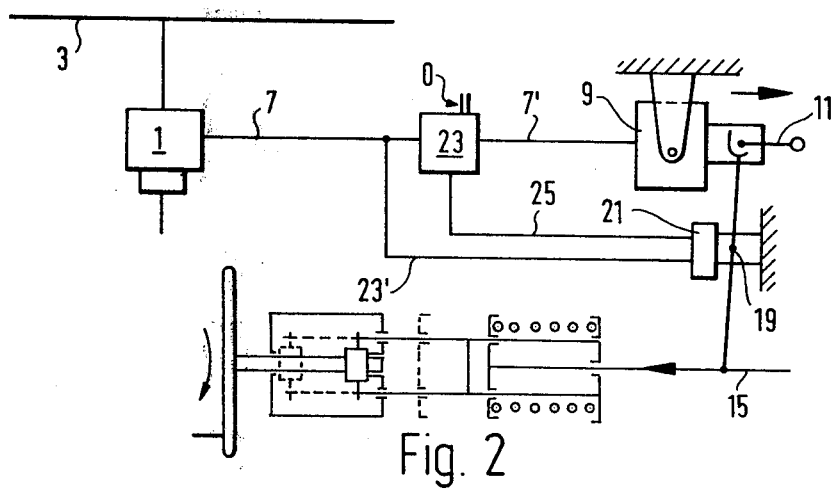

Other objects and advantages of the present invention will be apparent upon reference to the accompanying description when taken in conjunction with the following drawings, which are exemplary, wherein;

FIG. 1 is a diagrammatic view showing schematically the components of the braking apparatus according to the present invention and their interrelationships; and FIG. 2 is a view similar to that of FIG. 1 but showing a modification thereof.

Proceeding next to the drawings wherein like reference symbols indicate the same parts throughout the various views a specific embodiment and modifications of the present invention will be described in detail.

As may be seen in FIG. 1, a control valve device 1 is connected to a main air line 3 of a motor or rail vehicle having an air braking system and to an air reservoir 5. An air line or condulit 7 connects the control valve device 1 with a control device 23 and continues through conduit 7' to a brake cylinder 9 of a service brake which is pivotally mounted from a frame of a vehicle, in a known manner. An actuating member 11 which may be the piston rod, extends from the brake cylinder 9 to be connected through suitable brake linkage to a brake shoe or other form of brake member in a manner known in the art and not shown in the drawings.

Extending from the control device 23 is a control conduit or tube 25 for air which is connected to a switching device 21. The switching device 21 is connected by conduit 22 to the air reservoir 5 and supplies an auxiliary control pressure to the conduit 25 from the air reservoir 5. Extending from the switching device 21 is an actuating member 11 having a bearing support or coupling point 17 upon which is pivotally supported or connected the central portion of a lever 13. The lever 13 has one end pivotally connected to an actuating member 15 of a parking brake actuator which is shown in FIG. 2. The arrow at lever 15 indicates the direction of movement of the parking brake actuating member into the braking or locking position.

The other end of the lever 13 is coupled to the service brake actuating member 11 through a meshing or gear connection 20 which functions in such a manner that movement of the service brake actuating member 11 does not cause any movement or deviation in the lever 13, but when the lever end 15 is moved by application of the parking brake a force will be transmitted between the lever 13 and the actuating member 11.

The meshing or gear connection 20 includes a projection on the upper end of the lever 13 which is positioned to the left of a pin on the actuating member 11 to define a form of a detent coupling. When the actuating member 11 moves to the right, its left end moves away from the upper end of the lever 13 without engagement therewith and, accordingly, the lever 13 remains in its rest position. On the other hand, if there is a force acting against the lower end of the lever 13 in the direction of the arrow, the lever 13 will pivot clockwise about its bearing support 17 such that the upper end of the lever 13 will engage the pin on the actuating member 11 and move the actuating member 11 to the right. This connection between the lever 13 and the actuating member 11 can be described as a form of a detent or stop coupling which has been long used for the coupling of hand brakes, at least in European rail vehicles.

With this connecton between lever 13 and service brake actuating member 11 any application of the service brake will not produce any displacement or deviation of the lever 13. Thus, the actuating member 19 of the switchilng device 21 will not be actuated. Accordingly, the switching device 21 which may comprise a cross-over or reversing valve, will remain closed so that the control conduit 25 to the control device 21 is not supplied with any auxiliary control pressure.

However, when the service brake has been applied so as to be in the braking position and, in addition, the parking brake is applied, the lever 13 will pivot about its connection 20 to exert a force on bearing 17 of the actuating member 19 of switching device 21. If this movement of the lever 13 is sufficient to overcome the magnitude of a predetermined coupling force or mechanical-resilient resistance between the actuating member 19 and the lever 13 the actuating member 19 will be moved to actuate or switch over the switching device 21 into an open position so as to permit the flow of air under pressure into the control conduit 25. The control device 23 under the influence of the auxiliary control pressure and conduit 25 will then close the conduit sections 7 and 7' to vent or exhaust the service brake cylinder 9. The service brake will then move to its release position.

The force exerted on the actuating member 19 of the switching device 21 at that moment of the switching over or actuation of the switching device 21 corresponds to a previously determined holding force of the lever 13 with respect to the parking brake.

This holding force is so selected or determined that its inevitable addition to the existing force applied by the service brake does not increase to the extent so as to cause any damage or destruction of any of the elements or of such a magnitude as to initiate jamming or binding of the brake linkage or other braking components. This force level is such that at the moment of switching over of the holding force from the service brake to the parking brake a braking force will exist which is sufficient to prevent any further movement of the vehicle.

Since the actuating member 19 of the switching device 21 causes the switching over of the switching device 21 and actuation of the valve incorporated therein only at that moment when a predetermined mechanical resilient force is overcome, it is assured that the service brake will be released at that moment at which a certain braking force already exists in the parking brake but that the short term addition of the parking brake force to the service brake force will not produce any damaging or disadvantageous effects.

The switching device 21 can comprise any one of a number of known elements or structural features. As one embodiment, the actuating member 19 can be disposed movably approximately parallel to the holding force exerted by the locking brake member 15, as indicated by the arrow in FIG. 1 so as to act against a pretensioned spring within the housing of the switching device 21. Displacement of the actuating member 19 can thus actuate a two-way valve which, at the moment of actuation, shuts off auxiliary control conduit 25 from the air source 5. This will cause the control device 23 to be open to the atmosphere as indicated at 0 to vent the service brake cylinder 9.

In the modification illustrated in FIG. 2, the switching device 21 receives fluid braking pressure through a conduit 23' which is connected to conduit 7 interconnecting the control device means 1 and the control device 23. In this modification the conduit 23' will be constantly supplied with pressure fluid to produce a braking pressure and this braking pressure is available in the switching device 21 up to that moment that the switching device 21 is actuated because of increased braking force being applied by the parking brake at lever end 15. The switching device 21 then functions as previously described to actuate control device 23 to vent the service brake cylinder 9.

While both the switching device 21 and the control device 23 have been disclosed herein as being fluid pressure or pneumatic control devices, these components could also comprise a mechanically actuated switch and an electromagnetic valve connected through the intermediary of an electrical conductor in place of the conduit 25. It is also possible to position the control device 23 in its rest or normal position under the action of the auxiliary control pressure which then is interrupted when the switching device 21 is switched over or actuated.

According to the present invention, the lever 13 can be coupled with the service brake cylinder actuating member 11 and the locking brake member 15 in such a manner that the lever 13 rotates during application of the service brake such that the brake cylinder 9 in effect rotates about the bearing 17 but no forces are transmitted by the lever 13. Under these conditions, the switching device 21 remains unactuated. In this modification, the upper end of the lever 13 is forked and when the rearward end of the actuating member 11 is positioned within this fork a powerless pivoting of the lever 13 in a braking operation is achieved. In such a modification a manually operated brake is generally connected to the lower end of the lever 13 by a rope or chain. In this modification also, there will occur a switching over of the switching device only if during the application of the parking brake the lever 13 is sufficiently loaded to transmit the force necessary to actuate switching device 21.

Thus, it can be seen that the present invention has disclosed a braking apparatus for a vehicle wherein through the employment of control devices a service brake in the braking position will not be subjected to the addition of forces of an undesired or excessive magnitude upon the application of the selectively operable parking brake. Any increase in force on the service brake resulting from the application of the parking brake will be only momentary so as to actuate a switching device and will be of such a low magnitude that no undue stress will be imposed upon the service brake linkage including brake rods or brake cables.

It will be understood that the invention is susceptible to modification in order to adapt it to different usages and conditions, and accordingly, it is desired to comprehend such modifications within this invention as may fall within the scope of the appended claims.

What is claimed is:

1. A braking apparatus for vehicles comprising a service brake having a fluid pressure operated brake cylinder, control device means connected to said brake cylinder for controlling said brake cylinder, an actuating member extending from said brake cylinder and adapted to be connected to a braking member, a selectively operable parking brake, a lever operatively connecting said parking brake and said service brake actuating member, a switching device connected to said control device means to control the admission of fluid pressure to said brake cylinder, means for defining a bearing of said lever on said switching device, said switching device being actuated by a reaction force acting upon said bearing means through said lever when the reaction force exceeds a predetermined level such that a predetermined braking force is generated by the parking brake when said parking brake is actuated to a locking position.

2. A braking device as claimed in claim 1 wherein when said reaction force exceeds a predetermined level the bearing means is displaced to actuate said switching device.

3. A braking apparatus as claimed in claim 1 wherein said switching device has a second actuating member, said bearing means is on said second actuating member and supporting said second actuating member and said lever with a predetermined force, said switching device being actuated when said force is exceeded, the force to be applied to overcome said supporting force corresponds to a braking force produced by the parking brake in its locked position.

4. A braking apparatus as claimed in claim 1 wherein said switching device comprises a valve connected by a conduit to a reservoir for air, said control device means comprising a control device and a control valve, a second conduit connecting said switching device to said control device, said control device comprising a pneumatically controllable change-over valve.

5. A braking apparatus as claimed in claim 4 wherein there is an auxiliary control pressure in said second conduit supplied from said air reservoir.

6. A braking apparatus as claimed in claim 4 and further comprising a third conduit connecting said switching device to the connection between said control device and a control valve such that brake pressure is transmitted to said switching device, there being an auxiliary control pressure in said second conduit.

7. A braking apparatus as claimed in claim 1 wherein said switching device comprises an electric control device, said control device means comprises a control valve device and an electromagnetic control valve, and an electrical connection between said switching electrical control device and said electromagnetic control valve.

* * * * *